United States Patent [19]
Simon

[11] Patent Number: 5,859,663
[45] Date of Patent: Jan. 12, 1999

[54] AUDIO CONTROL SYSTEM FOR VIDEO TELECONFERENCING

[75] Inventor: Allen H. Simon, Chandler, Ariz.

[73] Assignee: Intel Corporation, Santa Clara, Calif.

[21] Appl. No.: 901,684

[22] Filed: Jul. 29, 1997

Related U.S. Application Data

[63] Continuation of Ser. No. 306,623, Sep. 15, 1994, abandoned.

[51] Int. Cl.$^6$ ................................................. H04M 11/00
[52] U.S. Cl. ............................................. 348/15; 379/202
[58] Field of Search ................................ 348/15, 14, 16; 379/202, 204, 205, 93.21, 93.23, 93.17; 370/260, 261, 262

[56] References Cited

U.S. PATENT DOCUMENTS

| | | | |
|---|---|---|---|
| 4,531,024 | 7/1985 | Colton et al. | 348/15 |
| 4,805,205 | 2/1989 | Faye | 379/96 |
| 5,440,624 | 8/1995 | Schoof, II | 379/202 |
| 5,473,367 | 12/1995 | Bales et al. | 379/96 |
| 5,491,743 | 2/1996 | Shiio et al. | 348/15 |

OTHER PUBLICATIONS

"Multipoint Communication Service Protocol Specification" International Telephony Union (ITU), Feb. 4, 1994.

*Primary Examiner*—Stella Woo
*Attorney, Agent, or Firm*—William H. Murray, Esq.; N. Stephan Kinsella, Esq.

[57] ABSTRACT

A visual indicator is employed on screen at each station of a video teleconference to inform respective participants of their place in a talk request queue. The indicators are controlled automatically in accordance with designer-chosen conference parameters. Optional system failsafe mechanisms protect against system lock-up.

19 Claims, 2 Drawing Sheets

AUDIO CONTROL SYSTEM FOR VIDEO TELECONFERENCING

This is a continuation of application Ser. No. 08/306,623 filed on Sep. 15, 1994, now abandoned.

BACKGROUND OF THE INVENTION

This invention relates to video teleconferencing and, more particularly, to techniques for controlling the source of the audio portion of a video teleconference.

During the course of a video teleconference involving three or more participating stations, it is often difficult for the participants to know who wishes to talk next. This problem can be exacerbated by time delays inherent in the system (i.e. "audio latency"). These time delays are not so problematic for the case of just two participants, but when three or more participants are involved significant confusion can be caused. If coordination of the video and audio (i.e. "lip synched video") is desired, it is not practical to eliminate the time delays, since significant time is required to implement the necessary video compression and decompression algorithms needed for transmission of the video images on moderate bandwidth channels.

It would therefore be considered highly desirable to have a method for allowing all participants in a video teleconference to be made aware of who wishes to speak next, and to provide a logical and fair arrangement for allocating speaking opportunities.

SUMMARY OF THE INVENTION

The Applicant has determined that the preferred way to inform the teleconference participants of their respective "right to talk" (or transmit other data) statuses is to provide each of them with a visual indication of their individual status, to wit:

(1) Green (meaning "It is OK for you to talk now");
(2) Yellow (meaning "Your request to talk has been received, so be ready to talk when you get a green signal"); and
(3) Red (meaning "To talk now will be fruitless, because no one else will hear you. If you wish to talk, please press your talk request key and you will be entered at the end of the talk request queue").

The above-mentioned color visual indicator would normally be on screen at each station location throughout the course of the teleconference. The system is controlled either by specific hardware logic installed at each station or by some teleconference interactive software installed at each station.

Various other features for establishing parameters for automatically controlling the teleconference format and procedure are also included. Also, with some embodiments, printed messages and instructions to the various participants will appear on the respective video screens. The system can include a failsafe arrangement so that faulty hardware or software at an individual station does not jeopardize the entire teleconference.

DETAILED DESCRIPTION

The Applicant has discovered a preferred technique for implementing a video teleconference involving three or more stations. The basic idea comprises providing a visual indicator to each participant to apprise each of their current "speaking status".

Figure 1:
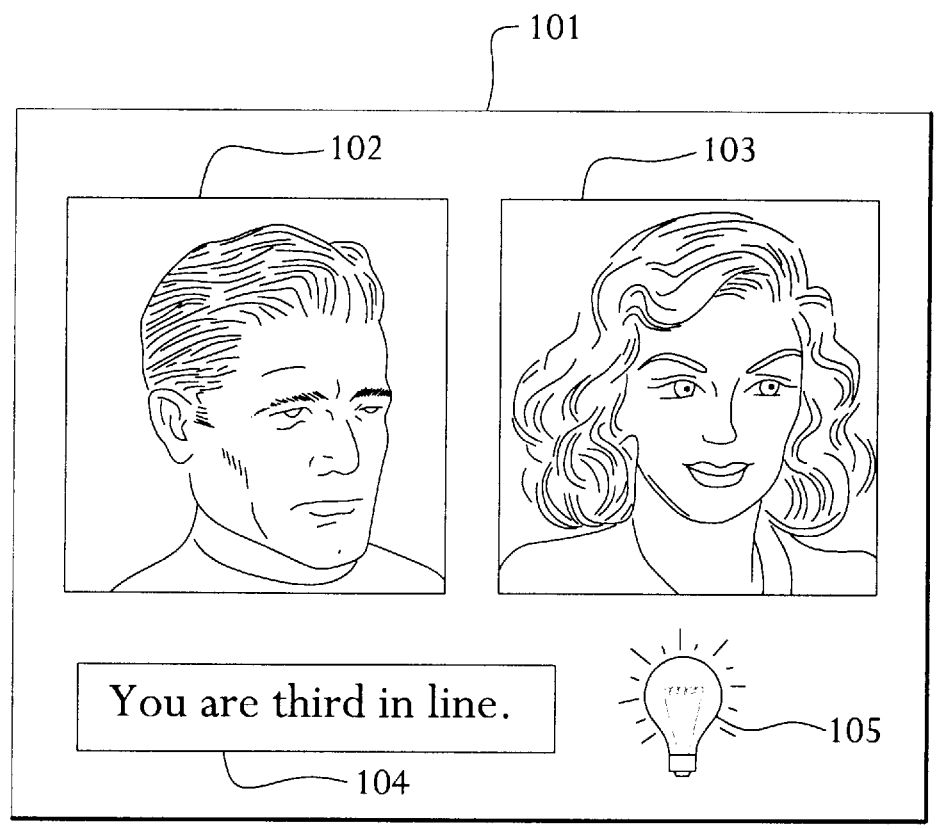
FIG. 1 depicts a typical video screen employing the technique of the instant invention.

Preferably, the appropriate indicator will appear directly on each participant's video screen as shown by the light bulb symbol 105 in FIG. 1. Therein also on video screen 101 are the speaker's video image 102 (on the left), and the video image of that station's participant 103 (on the right). Also, there may be a short control message block 104. This block will indicate to a speaker when others wish to speak, and will tell the others their place in the talk request queue. When that station's participant is the one speaking, the previous speaker is preferably displayed on the left, thereby keeping that station's participant's image on the right. As an alternate embodiment, a participant's window may be at the same place on the display, but instead of indicating who the previous speaker is by position on the display, there would be some indication in the window frame displaying his face.

The light bulb indicator 105 serves as a reminder to all participants of their own individual speaking status. The current speaker being heard by all the participants will have a green bulb, while all the other participants will have either a yellow or red bulb. A yellow bulb will indicate to that participant that as soon as the current speaker is finished, that participant will be expected by all participants to speak next. A red bulb will indicate to that participant that it is not yet near time to speak from that terminal. Only those who express an interest in speaking by pressing their respective local "talk request" keys will eventually get a yellow light and then a green light as they move up in the talk request queue. The talk request key could also be voice-activated. The optional comment block 104 can indicate that participant's place in the speaking queue, or can provide other pertinent information.

Figure 2:
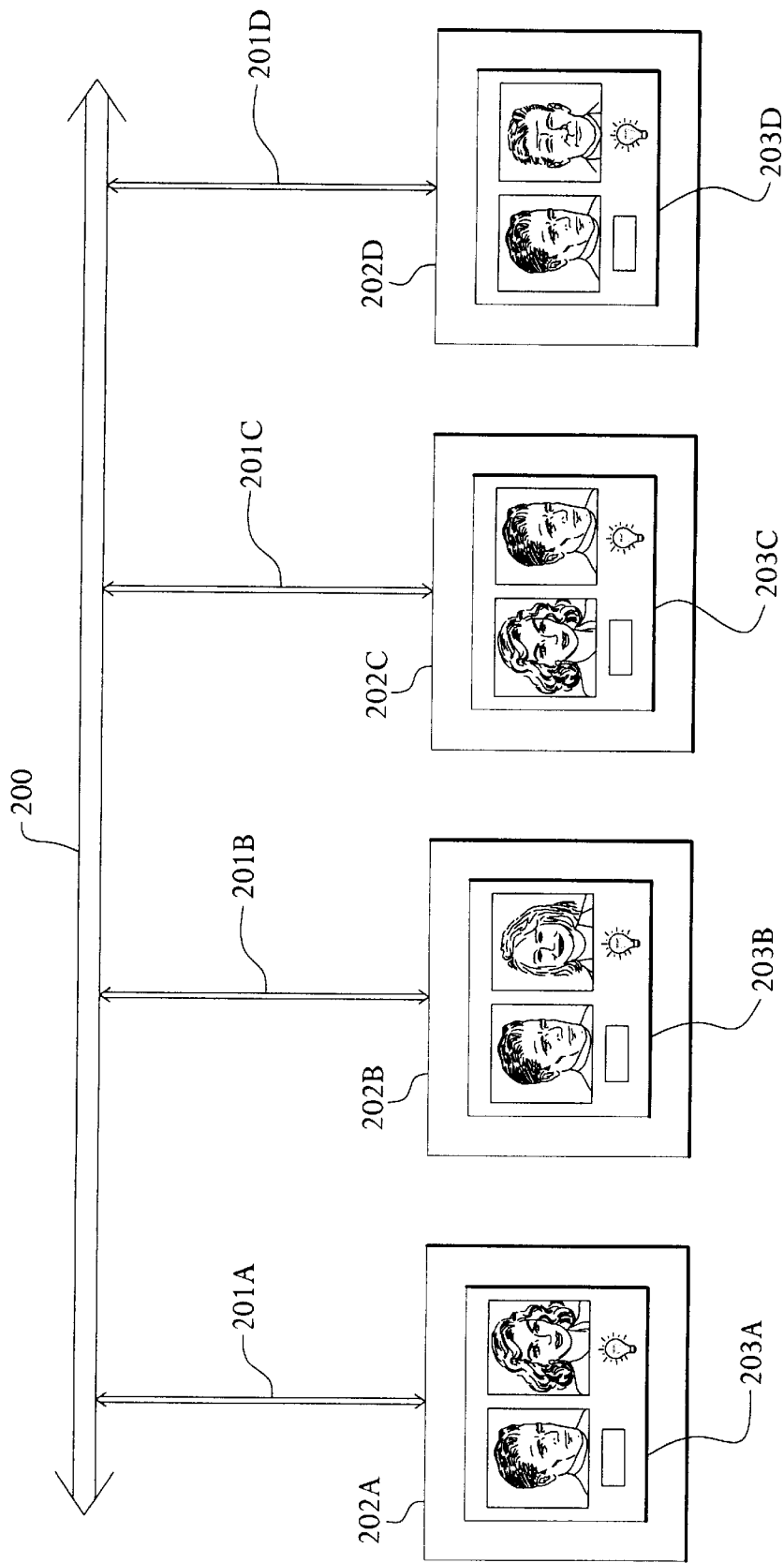
FIG. 2 shows a typical videoconference involving four stations.

FIG. 2 shows apparatus for a typical video conference of four participants, comprising a common video transmission medium 200 with connections 201 (A–D) tapped in to connect conference stations 202 (A–D) together.

Note that the speaker is shown on the left at each terminal except at the speaker's own terminal (in this case terminal C), where the speaker's image remains on the right where it usually is, and the immediately-previous speaker's image is displayed on the left.

A main purpose of the method of the instant invention is to provide a systematic, fair, logical, predictable format for teleconferencing that eliminates confusion and is easy to learn. Although being machine controlled (either by hardwired logic circuits or by software), the system is potentially tailorable for various possible expected human characteristics. The implementations of the method will be easily accomplished by those skilled in the arts of processor programming and logic circuit design in accordance with the nuances of the particular computer environment being used for the teleconferencing.

The method includes many features not considered in the basic format discussed above. In particular, the system for implementing the method may include the ability to handle several potentially disruptive events:

(1) Two or more participants press their respective talk request keys at the same time. In this case the system may arbitrarily choose one before the other.
(2) The speaker with the yellow light does not begin to speak immediately when the yellow light turns to green. Here the system design allows for a specified time delay (possibly operator-adjustable) to occur before the system switches the "talk now" option to the next in line in the talk request queue. A typical time delay for this purpose might be 3 seconds, for example. The speaker can also implement, by key or voice command relinquishment of the right to speak.

(3) One or more requests to speak are made while a speaker is talking. Here, the speaker is allowed to continue to speak or transmit images until a stoppage of speaking or transmitting occurs for a particular length of time (for example, 3 seconds). (This time is in addition to any system audio latency due to the transmission process.) Once this threshold is met, the speaker's light turns red and the next up in the talk request queue gets a green light to go ahead and speak to the group.

(4) There could be confusion over who should be able to speak first in the conference. In a preferred embodiment, the person who initiates the conference will have the first opportunity to speak.

(5) A hardware failure may occur at one or more of the conference stations. This can be dealt with in various ways, two of which are: (a) a maximum time for any speaker to "hold the floor" can be imposed when others have requested to speak (once this time is exceeded, the green light is switched to the next in the speaking queue) wherein a prior visual indication is given to the speaker when he is about to lose the right to speak. This could be done by blinking the green light, or by providing a time countdown display on the speaker's local video display; and (b) at regular intervals (e.g. every 5 seconds) all stations automatically communicate with the station having the green light with a systems update signal request (if the update signal request is not answered by the station with the green light, that station will be considered by the system to be inoperable, and the next station in the talk request queue will be granted the green light).

It is to be understood that the invention is not limited to the details described above, but is defined rather by the scope of the appended claims and their fair equivalents.

What is claimed is:

1. In a video teleconferencing system comprising a plurality of participating stations, a method for allocating speaking turns, comprising the steps of:
   (A) employing a visual indicator at each participating station for viewing by a participant at the station to characterize each participating station's individual transmission status;
   (B) allowing at any point in time, the visual indicator of only one of said plurality of participating stations to indicate that that one station is cleared to transmit, wherein each of said participating stations includes a talk request key whereby a teleconference participant can acquire a place in a talk request queue of conference participants who desire to have an option to transmit, further wherein a specified time delay is provided to allow a participant, whose visual indicator has just changed to a cleared to transmit status, a limited period of silence before that participant is required to speak.

2. The method of claim 1, wherein said visual indicator comprises more than one mode of indication.

3. The method of claim 2, wherein said visual indicator comprises two modes of indication.

4. The method of claim 3, wherein said two modes of indication comprise two colors.

5. The method of claim 4, wherein said two colors are green and red.

6. The method of claim 5, wherein said green color indicates that a station is cleared to transmit, and said red color indicates that a station is not allowed to transmit.

7. The method of claim 2 wherein said visual indicator comprises three modes of indication.

8. The method of claim 7 wherein said three modes of indication comprise three colors.

9. The method of claim 8 wherein said three colors are green, yellow, and red.

10. The method of claim 9 wherein said green color indicates that a station is cleared to transmit, said yellow color indicates that a station is not allowed to transmit but is the next station that will be allowed to transmit, and said red color indicates that a station is not allowed to transmit and is not the next station that will be allowed to transmit.

11. The method of claim 1, wherein said visual indicator comprises an icon on computer video displays located at each of said participating stations.

12. The method of claim 11, further comprising a printed message area on said computer video displays.

13. The method of claim 1, wherein a printed message on a computer video display at each of said participating stations indicates each respective station's own place in said talk request queue, if at all.

14. The method of claim 1, further comprising the step of choosing arbitrarily the respective places in said talk request queue for participants who press their respective talk request keys at the same time.

15. The method of claim 1, wherein said time delay is specified by the conference participant who has initiated said conference.

16. The method of claim 1, wherein the participant whose visual indicator has just changed to the cleared to transmit status is allowed the limited period of silence before that participant is required to speak (or otherwise give up the option to speak to the next participant in talk request queue), unless the speaker voluntarily relinquishes control by key or voice command before the expiration of said specified time delay.

17. In a video teleconferencing system comprising a plurality of participating stations, a method for allocating speaking turns, comprising the steps of:
   (A) employing a visual indicator at each participating station for viewing by a participant at the station to characterize each participating station's individual transmission status;
   (B) allowing at any point in time, the visual indicator of only one of said plurality of participating stations to indicate that that one station is cleared to transmit, wherein each of said participating stations includes a talk request key whereby a teleconference participant can acquire a place in a talk request queue of conference participants who desire to have an option to transmit, further wherein a participant at a station having the option to transmit is allowed to continue to speak until a stoppage of speaking occurs for a specified stoppage time.

18. The method of claim 17, wherein after the specified stoppage time that participant is no longer allowed to transmit and the option to speak is transferred to the next participant in said talk request queue.

19. In a video teleconferencing system comprising a plurality of participating stations, a method for allocating speaking turns, comprising the steps of:
   (A) employing a visual indicator at each participating station for viewing by a participant at the station to characterize each participating station's individual transmission status;

(B) allowing at any point in time, the visual indicator of only one of said plurality of participating stations to indicate that that one station is cleared to transmit, wherein each of said participating stations includes a talk request key whereby a teleconference participant can acquire a place in a talk request queue of conference participants who desire to have an option to transmit, further wherein all stations participating in said conference automatically communicate with whichever station currently has the option to transmit, wherein said automatic communication uses a system update signal request at regular time intervals, wherein if said station currently having the option to transmit does not respond, said station currently having the option to transmit will automatically lose said option to the next station in the talk request queue.

* * * * *